United States Patent [19]
Renaud

[11] 3,749,447
[45] July 31, 1973

[54] VEHICLE SAFETY SWITCH WITH REMOVABLE DIELECTRIC PLUG

[76] Inventor: Richard Renaud, 303 Sherbrooke St., Ste. Therese de Blainville, Quebec, Canada

[22] Filed: Sept. 20, 1971

[21] Appl. No.: 182,022

[52] U.S. Cl............... 200/44, 200/51.09, 200/51.1, 200/61.62, 340/52 H
[51] Int. Cl....................... H01h 27/04, H01r 33/00
[58] Field of Search................. 200/16 R, 44, 51.09, 200/51.1, 61.62–61.68; 340/52 R, 52 H

[56] References Cited
UNITED STATES PATENTS

| | | | |
|---|---|---|---|
| 2,768,234 | 10/1956 | Popp | 200/51.1 X |
| 3,011,035 | 11/1961 | Gloviak et al. | 200/51.09 |
| 3,217,117 | 11/1965 | Schott et al. | 200/51.09 |
| 2,774,855 | 12/1956 | Simmons | 200/44 X |
| 2,870,273 | 1/1959 | Merchant | 200/16 R X |
| 3,418,438 | 12/1968 | Burrett | 200/51.1 |
| 3,636,282 | 1/1972 | Kirchdorf | 200/16 R |

Primary Examiner—J. R. Scott
Attorney—Beaman & Beaman

[57] ABSTRACT

Various methods of grounding and stopping engines having an electrical ignition system are known. In this invention a device is introduced into such a system whereby it is grounded by normally closed switch contacts until these contacts are separated by the insertion of a dielectric key. The contacts are wired into the ignition system and the switch housing is affixed to the dashboard and steering column of the vehicle such as a snowmobile so that the withdrawal of the key causes the contacts to engage and instantly grounds and stops the engine.

1 Claim, 8 Drawing Figures

PATENTED JUL 31 1973 3,749,447

VEHICLE SAFETY SWITCH WITH REMOVABLE DIELECTRIC PLUG

My invention relates to a safety switch for bringing an automotive vehicle to a halt in the event of an accident.

More particularly, my invention relates to a safety switch connected in the ignition circuit of a vehicle engine and actuatable to render the engine operative or inoperative.

More particularly still, my invention relates to a safety switch, the inclusion of which in the ignition wiring of an automotive vehicle, will avert a common type of accident wherein the said vehicle, having become driverless as the result of an accident, is brought to an immediate halt and thus avoiding the extremely hazardous and costly consequences of a run-away vehicle whose operator has been thrown from it and is unable to turn off the ignition. Many accidents produced by this situation occur during the year, particularly in connection with snowmobiles and other small but speedy means of transport, in which the danger is great that an untoward heave or a side-swiping collision may dislodge the driver and leave the vehicle in full gear to take its own course against other vehicles, pedestrians or buildings. While such accidents occur, particularly in the use of recreational vehicles, such as the popular snowmobile, they may also occur with farm tractors or even power driven lawn mowers and the speed of the vehicle in question is not always the significant factor in avoiding the accident.

In the case of a number of automotive vehicles and in particular snowmobiles and tractors, wherein the operator of the vehicle is sitting in an open area, the ignition must be manually turned off before the engine will stop. Such manual switching is impossible if the driver is dislodged from his seat, as he may be in the event of a violent jolt. Even in the event of a head-on collision, in which the driver is thrown forward, the vehicles may be so aligned that he or a passenger is catapulted into the path of his own vehicle and unless the vehicle is brought to an immediate halt, he or the passenger may well be run over.

In the circumstances, I have found that the majority of such vehicles are poorly equipped to meet such an emergency and none contain a device for cutting off the power of the engine upon the dislodgment of the operator.

The function of the switch of my invention is to bring to a halt a powered unit in motion, either by the action of the operator or in the event that the operator is dislodged from the driver's seat. The powered unit is halted when the key of my invention is withdrawn from the switch. Should an accident result in the separation of the operator from the powered unit, the key attached to his person by a harness will disengage from the switch and render the powered unit inoperational. The unit furthermore will not operate unless the key is first inserted into the switch, and this consitutes an additional protection against inadvertent failure to take the necessary safety precautions.

Vehicles fitted with my safety switch would be brought to an immediate halt when the driver is thrown from the vehicle.

My switch assembly consists of three basic parts:
1. Switch contact elements
2. A dielectric switch key
3. A harness or lanyard by which the switch key is attached to the operator of the vehicle.

These components are installed in the ignition circuit in such a way that the terminals of the circuit receive the positive feed and the negative ground wires which are routed from the spark plug magneto. The switch contacts are neutral in polarity and can be separately connected either to the positive or to the negative magneto lead wire. The contacts are also encased to prevent damage by exposure to external elements. The switch key is a solid cylindrical dielectric plug, preferably constructed completely of nylon. A hole is incorporated at one end of the key for the purpose of connecting it to the harness or lanyard. The said harness or lanyard may be of any flexible material having the requisite strength and appropriate length. It is attached to the key and at the other end to the operator in such a way that a sudden movement of the hand or body would be sufficient to withdraw the key from the switch contacts thereby allowing closure of the contacts. With the contacts closed, the positive feed is connected to the negative ground wires, thereby grounding the ignition system and causing the engine of the vehicle to stop.

The switch is installed in the power unit by annexing it to a suitable support, such as the steering mechanism. The switch contacts are connected in parallel circuit in relation to the regular ignition switch or to the spark plug magneto ground button, or switch. For this purpose, two lead wires, a positive feed and a negative ground are routed from the spark plug magneto and connected to the contact terminals of the switch. The switch contacts are normally closed, causing a ground condition to exist in the engine ignition system. Such ground condition renders it impossible for the engine to operate. In order to permit the engine to operate, the ground condition must be eliminated by separating the contacts. This is done by fully inserting the switch key into the switch tube, which insertion forces the contact points apart and eliminates the ground condition. The regular ignition system can then be used to operate the engine. Removal of the safety switch key permits the contacts to touch and grounds the engine. This ground condition will cut off the motor and bring the vehicle to a halt almost at once.

The invention is illustrated, by way of example, in the accompanying drawings in which.

Figure 1:
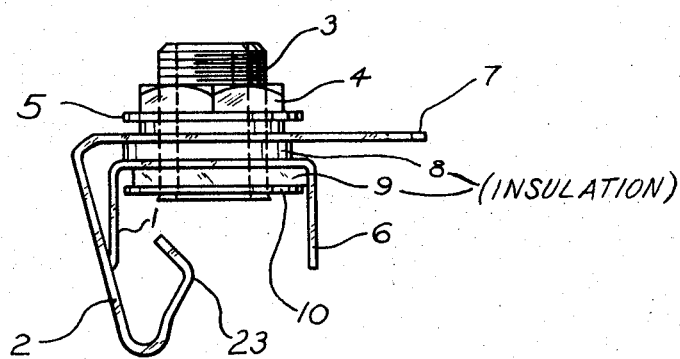
FIG. 1 is a side view of the switch assembly before the key is inserted.

FIG. 1 shows electrical conductive contact element 1 in contact with electrical conductive contact element 2 in the normally closed grounding position. 3 is a metal tube threaded on the outside and flanged at the base so that the nut 4 holds the tube in the contact elements 1 and 2 to form a switch assembly to be afixed to a convenient element of the vehicle driving mechanism (not shown). The metal washer 5 constitutes a mounting flange which separates the external elements of the switch from those which are contained in the switch box (not shown). The contact elements 1 and 2 are perforated at points 6 and 7 to provide terminals for the attachment of the lead wires. Electrical insulating washers 8 and 9 separate the contact elements from the metal washer 10 and the tube 3 which fits over the flanged end of the tube 3 in such a manner that when the nut 4 is tightened, the assembly is held in close conjunction and the contact element 1 is pressed against contact element 2.

Figure 2:
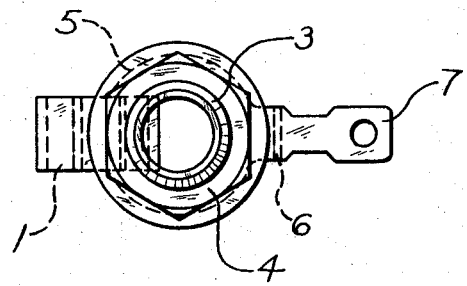
FIG. 2 is a front view of the switch assembly.

In FIG. 2, 1 represents the contact element which, before insertion of the switch key 11, is in contact or grounding position with contact element 2, as seen in FIG. 1. 3 is the metal tube and 4 is the nut holding the terminals and the tube in assembly. 5 is the metal washer separating the external elements of the switch assembly from those normally enclosed in the switch box. 6 and 7 are the perforated terminal ends, of the contact elements, adapted to receive the wiring from the ignition in connection with the magneto or the engine.

Figure 3:
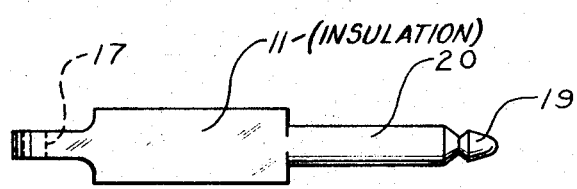
FIGS. 3 and 4 are side elevations respectively of the non-conducting switch key and a segment of the head thereof.

Referring to FIGS. 3 which is made of an electrical insulating material such as nylon and 4, 17 is a hole in one end of the dielectric key 11 through which a connecting lanyard (not shown) is attached. The lanyard is secured, at its other end, to the wrist or ankle of the operator of the automotive vehicle. 18 is a notch which engages the head 19 of the key with knuckle 23 of contact element 2.

Figure 4:
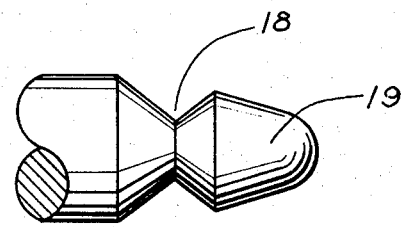
Figure 6:
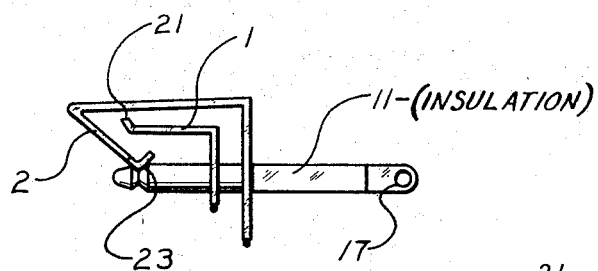
FIGS. 5 and 6 are diagrams in section of the terminals showing respectively the contact positions before and after the insertion of the non-conducting key.

In FIG. 4, a detail of the head 19 of the key 11 illustrates a greater magnification of the notch 18 which engages the knuckle 23 of the contact element 2 and forces it away from the contact point 21 of the contact element 1 (see FIG. 6).

Figure 5:
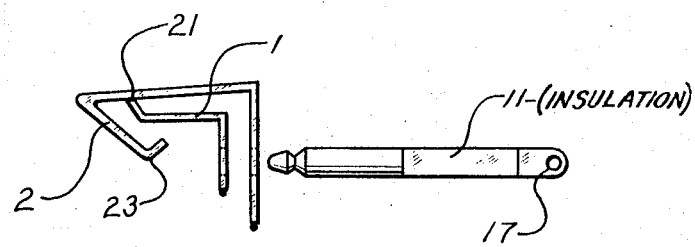

In FIG. 5, the contact elements 1 and 2 are illustrated with the switch key 11 withdrawn.

In FIG. 6, the switch key 11 is in its engagement position and the contact elements 1 and 2 are separated.

Figure 7:
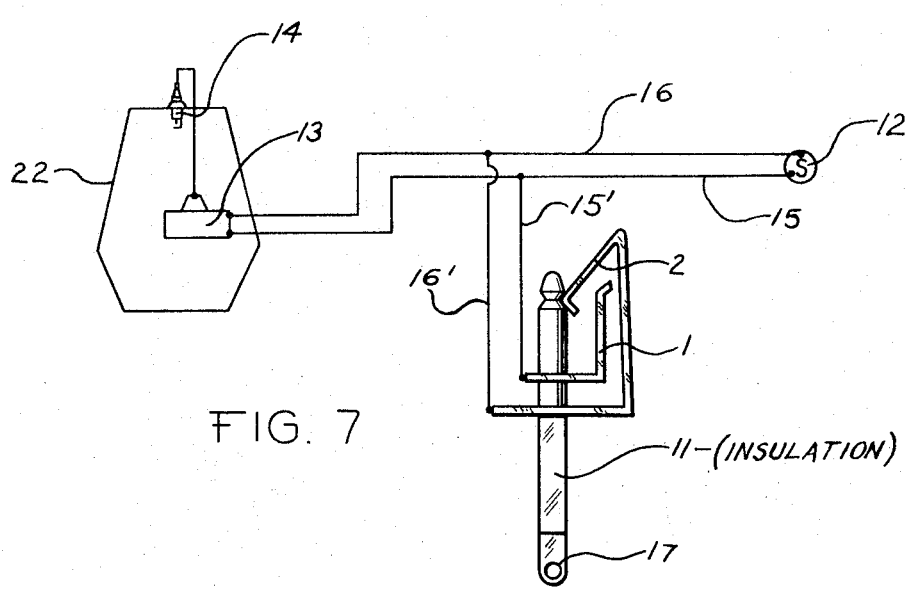
FIGS. 7 and 8 are wiring diagrams illustrative of the connections when my switch interrupts the circuit between the ignition switch in FIG. 7 and between the circuit breaker in FIG. 8 and the motor.
Figure 8:
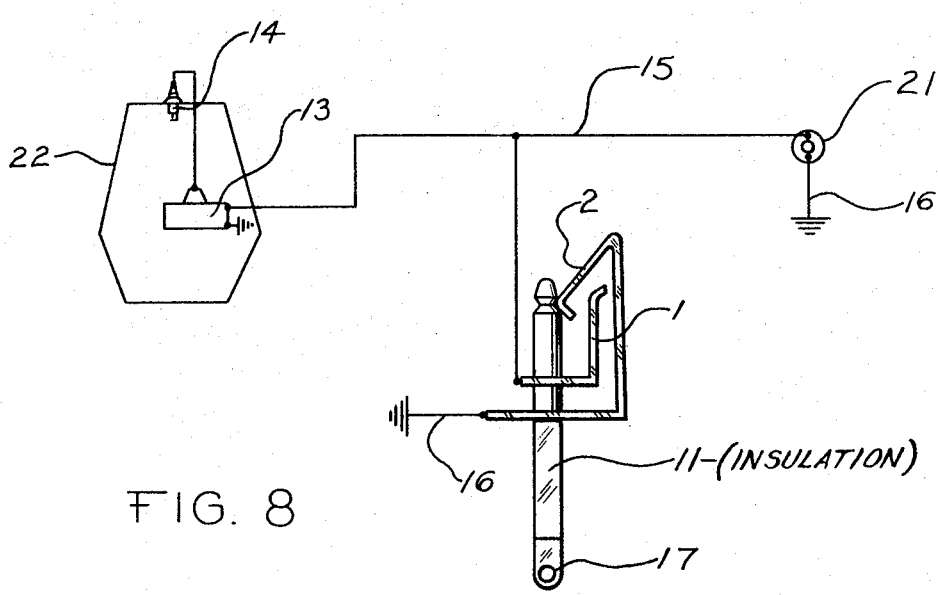

FIG. 7 illustrates the wiring diagrams; the connections shown are those employed when the switch is connected into the normal wiring between the ignition switch 12 and the magneto 13. FIG. 8 illustrates the wiring when a grounding button 21 is connected in the circuit. In both FIGS. 7 and 8, the switch is shown in diagram with the switch key 11 inserted so that the system is not grounded since contact element 2 is separated from contact element 1. The ignition switch 12 and the magneto 13 are connected to a spark plug 14. The connection with the switch assembly is affected by two lead wires 15' and 16'. Wire 15' connects to positive feed wire 16 and wire 15' connectes to negative ground wire 15 routed from the spark plug magneto 13 in the engine 22 so that the switch contact elements are connected across wires 15 and 16. The positive feed wire 16 and the negative ground wire 15 are so connected with the switch assembly of my invention that when the switch key 11 is removed, both in FIGS. 7 and 8, contact element 1 closes the circuit and grounds the system, thereby stopping the engine 22.

In the embodiment of my invention illustrated in the above drawings, the dimensions of the elements illustrated are as follows:

Length of the contact element 1 is 1½ inches, and of contact element 2 – 2½ inches. Their width in both cases is one-fourth inch reduced by a neck immediately below the perforations 6 and 7 to a width of one-eighth each which expands again to a width of three-sixteenths of an inch in which a perforation having a diameter of three thirty-seconds of an inch is punched. The tube 3 threaded on the outside has an internal diameter of one-fourth inch and an external diameter of three-eighths of an inch. It is nine-sixteenths of an inch in length and the hexagonal nut 4 is 3/8ths of an inch in internal diameter. The switch key 11 is made of extruded or molded nylon and is 1⅝ inch in length from the centre of the hole 17 to the tip of the head 19. The shaft 20 is one-fourth inch in diameter and body of the key 11 one-half inch in diameter. The head 19 at its widest point has a diameter of 0.225 inch and the projection of its conical sides forms an angle of 30° at the apex of the projection.

None of these dimensions are critical and they are given only to illustrate the construction of one embodiment of my invention.

In the operation of my invention the driver of the automotive vehicle must insert the key into the safety switch before he can utilize his regular ignition key. Once the vehicle is in motion any abrupt movement which would cause him to separate from the vehicle would result in the removal of the key from the switch and consequently causing immediate grounding of the motor, as disclosed hereinabove.

My invention is therefore of utility not only to bring the vehicle to a halt but to prevent the use of the vehicle by parties unfamiliar with the operation of the safety switch.

The embodiments of the invention in which an exclusive property or privilege is claimed are defined as follows:

1. In an electrical ignition system for a motorized vehicle having a positive feed wire connected to an engine spark plug and a negative ground wire, in combination, a safety switch comprising a tube adapted to axially receive a dielectric key therein, a pair of conductive contact elements secured to said tube and in electrical insulating relationship to one another and to said tube, said contact elements being connected to a respective positive feed wire and/ or a negative ground wire, said contact elements further having contact portions normally in electrical contact engagement with each other, one of said contact elements extending beyond an end of said tube and having a portion thereof disposed for frictional engagement with a portion of said key when positioned within said tube whereby said one contact is displaced by said key to separate said electrical contact engagement with said other contact element, said electrical contact engagement being resumed when said elongated key is no longer in frictional contact with said one contact element to render the ignition system inoperable.

* * * * *